(12) United States Patent
Ryu

(10) Patent No.: US 7,747,168 B2
(45) Date of Patent: Jun. 29, 2010

(54) MULTI SWITCHING ARCHITECTURE AND METHOD IN OPTICAL BURST SWITCHING NETWORK

(75) Inventor: Hyun-surk Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 11/282,749

(22) Filed: Nov. 21, 2005

(65) Prior Publication Data

US 2006/0147206 A1 Jul. 6, 2006

(30) Foreign Application Priority Data

Dec. 31, 2004 (KR) .................. 10-2004-0117700

(51) Int. Cl.
*H04J 14/00* (2006.01)
(52) U.S. Cl. ........................................ 398/52
(58) Field of Classification Search ............ 398/45, 398/46, 48, 49, 50, 51, 74
See application file for complete search history.

(56) References Cited

U.S. PATENT DOCUMENTS

| 6,256,125 | B1 * | 7/2001 | Uehara | 398/79 |
| 6,735,396 | B2 * | 5/2004 | Poustie | 398/155 |
| 7,200,330 | B2 * | 4/2007 | Shiomoto et al. | 398/51 |
| 7,215,666 | B1 * | 5/2007 | Beshai et al. | 370/380 |
| 7,397,792 | B1 * | 7/2008 | Beshai et al. | 370/355 |
| 2002/0154360 | A1 * | 10/2002 | Liu | 359/135 |
| 2003/0016414 | A1 * | 1/2003 | Solheim et al. | 359/127 |
| 2003/0189901 | A1 * | 10/2003 | Ozugur et al. | 370/230 |
| 2004/0170165 | A1 * | 9/2004 | Maciocco et al. | 370/389 |
| 2006/0039698 | A1 * | 2/2006 | Pautler et al. | 398/33 |

* cited by examiner

*Primary Examiner*—Shi K Li
(74) *Attorney, Agent, or Firm*—Sughrue Mion, PLLC

(57) ABSTRACT

An optical burst switching network is provided that includes an edge node transmitting burst data including a plurality of packets; and a core node optically switching received burst data or converting the received burst data into an electric signal and electrically switching the converted burst data.

9 Claims, 6 Drawing Sheets

FIG. 5

| SOURCE/DESTINATION INFORMATION PART | TRAFFIC TYPE INFORMATION PART | SIGNAL CURE SOLICITATION PART | UNIFICATION SOLICITATION PART | ACCUMULATION DELAY PART COUNTER | FREQUENCY PART | ... |

MULTI SWITCHING ARCHITECTURE AND METHOD IN OPTICAL BURST SWITCHING NETWORK

CROSS-REFERENCE TO RELATED APPLICATIONS

This application claims priority from Korean Patent Application No. 2004-117700, filed Dec. 31, 2004, in the Korean Intellectual Property Office, the disclosure of which is incorporated herein by reference.

BACKGROUND OF THE INVENTION

1. Field of the Invention

The present invention relates to an optical burst switching (OBS) network, and more particularly, to a method of reducing a transmission error of burst data (BD) in an OBS network.

2. Description of the Related Art

In general, an electrical switch is used to transmit and/or receive an optical signal through an optical fiber or a link. However, the electrical switch must convert the optical signal into an electric signal and the electric signal into the optical signal in order to process the received optical signal. Thus, a network that uses an electrical switch additionally requires an opto-electric converter to convert an optical signal into an electric signal and an electro-optic converter to convert an electric signal into an optical signal. As a consequence, cost of the network implementation is increased.

To solve this problem, optical burst switching has been suggested, which immediately processes a received optical signal without converting the optical signal into an electric signal. An OBS network using such optical burst switching will now be described.

In general, in an OBS network, IP packets that are input into an optical domain are collected as BD by an edge node. The BD passes through a core node, is routed, and is then transmitted to a destination node depending on destinations of the BD or Quality of Service (QoS). Also, a burst control packet (BCP) and the BD are separated from each other by an offset time and then transmitted using different channels. In other words, the BCP is transmitted prior to the BD by the offset time to reserve a path through which the BD is to be transmitted, which provides rapid transmission of the BD through the optical network without the BD being buffered. A process of transmitting optical data will now be described with reference to FIG. 1.

FIG. 1 illustrates nodes that transmit or receive the BD and nodes that switch the BD in an OBS network. A process of transmitting BD in an OBS network will now be described.

A node 100 is an edge node receiving and collecting IP packets to make BD. Edge nodes 100, 106, and 108 collect IP packets to create and transmit optical burst data packets or receive optical burst data packets to separate IP packets from the optical burst data packets. Core nodes 102 and 104 optically switch optical burst data. If BD having a desired size is generated, node 100 generates a BCP, transmits the BCP to core node 102, and transmits the BD to node 102 after an offset time. The BCP includes information of a destination address and a generation address of the BD, a size of the BD, a QoS offset time, and the like.

Node 102 checks a destination address of BD to be received after the BCP and node 102 determines an optical path using the BCP so as to reserve an optical switching time. The BCP is opto-electric converted and/or electro-optic converted in node 102, but the BD goes along the optical path only by optical switching without opto-electric conversion of the BD. Node 102 may optically switch the BD to node 106 or 104 depending on whether a destination of the BD transmitted from node 100 is node 106 or 108.

BD may be transmitted from node 100 to node 102 and then transmitted to node 106 or 108. However, node 102 may be a destination of BD generated by node 100 or node 102 may directly generate BD to be transmitted to node 106 or 108. In other words, node 100 that is a core node may have a function of an edge node.

However, in a case of a node B, destinations of BD transmitted from a node A and BD transmitted from a node C may be a node D. In this case, the node B may not transmit the BD to the node D at a point of time. Thus, the node B selects one piece of the BD and first transmits the selected BD piece. Also, unselected pieces of the BD may be delayed for a predetermined period of time and then transmitted. Thus, data loss may be prevented.

However, the OBS network does not have a buffering function. Thus, in a case where the OBS network receives a plurality of pieces of BD, the OBS network may not efficiently process the BD.

SUMMARY OF THE INVENTION

Accordingly, the present invention provides a method of processing a plurality of pieces of BD using an optical switch without an error in an OBS network.

Another aspect of the present invention is to provide a method of efficiently and separately processing pieces of BD having their own characteristics.

According to a further aspect of the present invention, there is provided an optical burst switching network including: an edge node transmitting burst data including a plurality of packets; and a core node optically switching received burst data or converting the received burst data into an electric signal and electrically switching the converted burst data.

BRIEF DESCRIPTION OF THE DRAWINGS

The above and other aspects of the present invention will be more apparent by describing certain exemplary embodiments of the present invention with reference to the accompanying drawings, in which:

FIG. 5 is a view illustrating a structure of a BCP according to an exemplary embodiment of the present invention;

DETAILED DESCRIPTION OF THE EXEMPLARY EMBODIMENTS OF THE INVENTION

Figure 1:
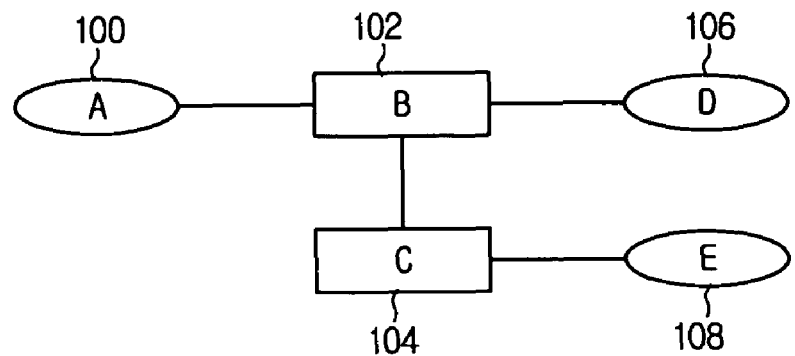
FIG. 1 is a view illustrating an OBS network including a plurality of nodes.

Exemplary embodiments of the present invention will be described in greater detail with reference to the accompanying drawings.

In the following description, same drawing reference numerals are used for the same elements even in different drawings. The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

Hereinafter, a method of efficiently transmitting BD from input links to output links according to an exemplary embodiment of the present invention will be described with reference to the attached drawings. Aspects of the present invention provide a method of processing BD in an electrical switch or an optical switch according to a characteristic of input BD.

Figure 2:
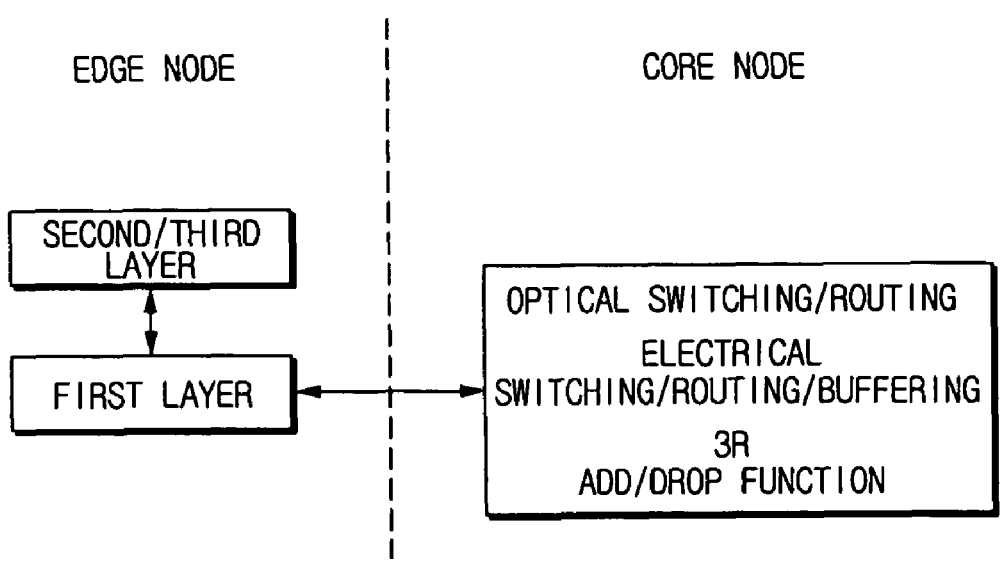
FIG. 2 is a view illustrating functions of layers of edge and core nodes according to an exemplary embodiment of the present invention.

FIG. 2 is a view illustrating structures of layers of edge and core nodes and operations of the layers according to an exemplary embodiment of the present invention. Referring to FIG. 2, in a conventional core node, a second/third layer performs an electrical switching function. In other words, the second/third layer converts an optical signal into an electric signal and processes the electric signal. In other words, the second/third layer switches and routes a received electric signal. However, in a core node according to an exemplary embodiment of the present invention, a first layer performs an optical switching/routing function and an electrical switching/routing function/buffering function. Also, the first layer of the core node performs a 3R regeneration function and an add/drop function. The 3R regeneration will be described later. An edge node transmits necessary information using a BCP so that the core node performs the above-described operations in the first layer.

The BCP includes various types of information besides existing information so that the first layer performs the above-described operations. This will be described later with reference to FIG. 5.

Figure 3:
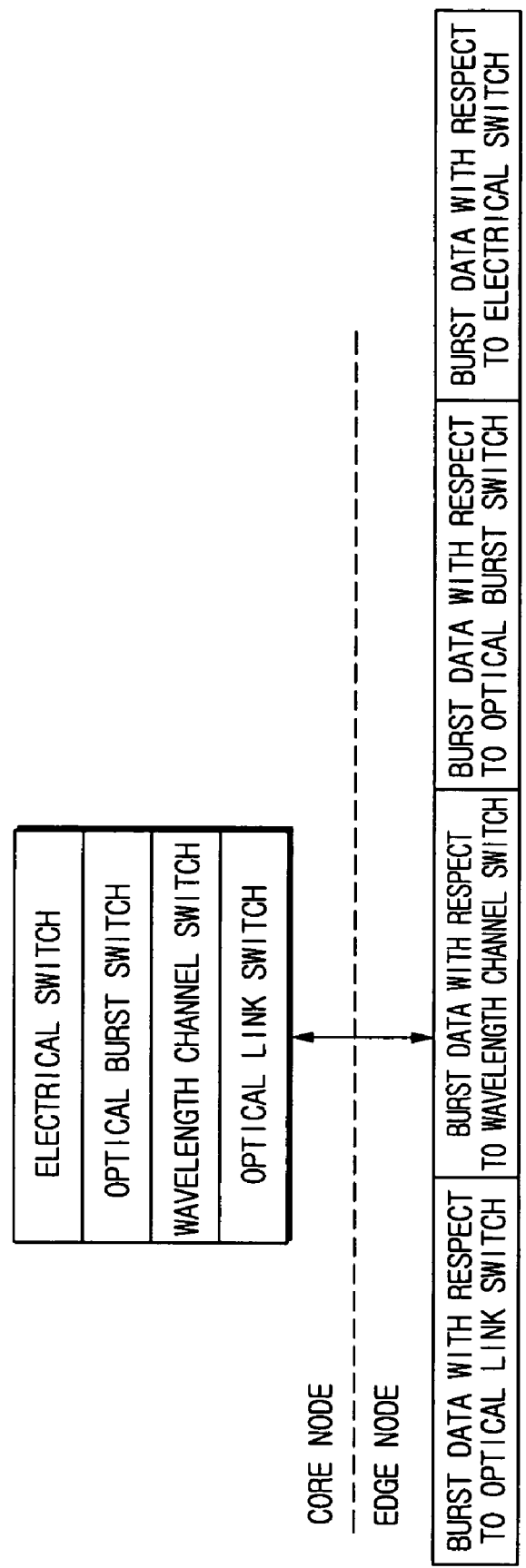
FIG. 3 is a view illustrating functions of layers of edge and core nodes according to another exemplary embodiment of the present invention.

FIG. 3 is a view illustrating various types of optical switches according to an exemplary embodiment of the present invention. In other words, referring to FIG. 3, optical switches may be classified into an electrical switch, an optical burst switch, a wavelength channel switch, and an optical link switch. The electrical switch converts a received optical signal into an electric signal and processes the electric signal as described above. In general, the electrical switch according to an exemplary embodiment has a buffering function of storing a received electric signal, a drop function of dropping the received electric signal, and an add function of adding a new electric signal. Also, if the electrical switch receives BD having an insufficient size, the electrical switch amplifies the BD or performs a necessary operation.

The optical burst switch processes a received optical signal (BD) without discriminating a wavelength or an optical link. In other words, the optical burst switch may transmit BD having the same destination using different wavelengths. Also, in a case where a channel of the received BD equal to an output channel is not available, the optical burst switch must change the channel of the received BD and then transmit the received BD. In addition, in a case where the optical burst switch is not able to process the received BD at a point of time, the optical burst switch delays the received BD and processes the received BD at a next stage. However, the optical burst switch cannot rapidly process a plurality of pieces of received BD. Thus, wasted BD may occur.

The wavelength channel switch and the optical link switch have been suggested to solve these problems. The wavelength channel switch allocates one wavelength (channel) to each destination node and transmits received BD using the allocated channel. Here, if a channel of the received BD is different from a channel of BD to be output, the wavelength channel switch performs a channel change. In other words, the wavelength channel switch converts a wavelength of the received BD into an allocated wavelength and transmits the received BD. As a result, a number of switching operations of BD may be reduced.

The optical link switch switches received BD in units of the links rather than in units of BD. In other words, the optical link switch is allocated one link with respect to each destination node. Thus, the optical link switch requires a minimum number of switching operations.

For this purpose, the edge node transmits BD to each switch which is to process the BD. As shown in FIG. 3, the edge node classifies the BD into BD to be processed by the optical link switch, BD to be processed by the wavelength channel switch, BD to be processed by the optical burst switch, and BD to be processed by the electrical switch. Also, a BCP additionally includes information as to switches which are to process BD to be transmitted.

Figure 4:
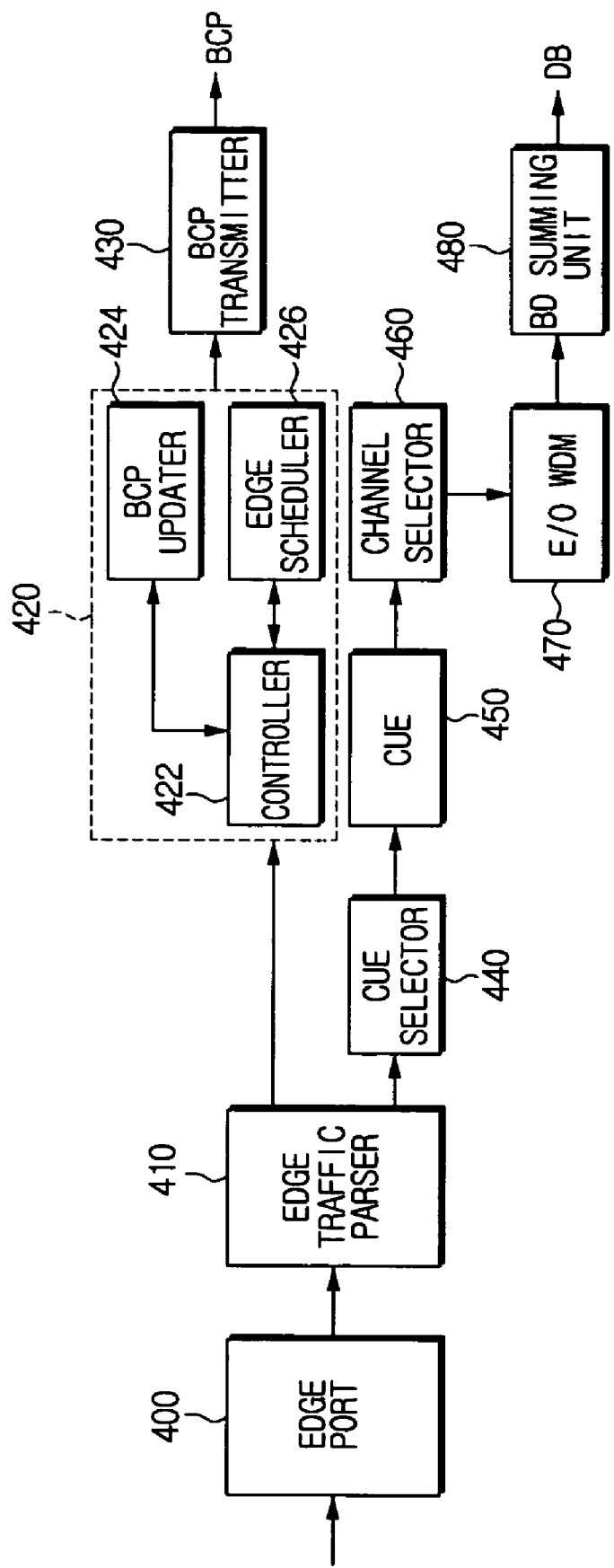
FIG. 4 is a block diagram illustrating a structure of an edge node according to an exemplary embodiment of the present invention.

FIG. 4 is a block diagram of an edge node according to an exemplary embodiment of the present invention. A structure of an edge node according to an exemplary embodiment of the present invention will now be described in detail with reference to FIG. 4.

Referring to FIG. 4, the edge node includes an edge port 400, an edge traffic parser 410, a BCP processor 420, a BCP transmitter 430, a cue selector 440, a cue 450, a channel selector 460, an E/O wavelength division multiplexer (WDM) 470, and a BD summing unit 480. BCP processor 420 includes a controller 422, a BCP updater 424, and an edge scheduler 426. The edge node or BCP processor 420 may include other components besides the above-mentioned components.

Edge port 400 receives BD and a BCP from an external source. Edge port 400 transmits the BD and the BCP to the edge traffic parser 410. Edge traffic parser 410 transmits the BCP to BCP processor 420. Edge traffic parser 410 classifies the BD by a destination node, traffic, path information, and a service type. Thus, received BD can be efficiently processed. In other words, the edge node allocates priority to the received BD to first process BD having high priority. Also, if a number of pieces of BD having the same destination node is accumulated to be greater or equal to a set value, the edge node may first process the received BD.

Cue selector 440 sets an area of cue 450 which is to buffer the received BD and instructs the set area to buffer the corresponding BD. Cue 450 buffers the received BD according to the instruction of cue selector 440. Channel selector 460 selects a wavelength to which the BD received from cue 450 is to be allocated. BCP processor 420 will now be described.

Controller 422 controls an operation of BCP processor 420. Controller 422 controls operations of cue selector 440, cue 450, and channel selector 460. In other words, controller 422 controls cue selector 440 to select cue 450 which is to buffer the received BD and controls channel selector 460 to select a channel to be allocated to the received BD.

BCP updater 424 updates the BCP according to a control command of controller 422. In other words, in a case where the edge node processes the BD, BCP updater 424 updates the BCP using processed information. Edge scheduler 426 schedules a general operation of the edge node according to the control command. BCP transmitter 430 receives the BCP from BCP processor 420 and transmits the BCP.

E/O WDM 470 multiplexes the BD using the allocated channel to transmit the BD. BD summing unit 480 sums at least one piece of received BD and transmits the summed BD using one optical link. As described above, a plurality of pieces of BD received from E/O WDM 470 may be transmitted at a point of time through wavelength division multiplexing.

Fields constituting a BCP will now be described with reference to FIG. 5. Referring to FIG. 5, the BCP includes a source/destination information part, a traffic type information part, a signal cure solicitation part, a unification solicitation part, an accumulation delay counter part, and a frequency part.

The source/destination information part includes information as to source and destination nodes. The source node refers to a node transmitting BD, and the destination node refers to a destination of the BD. The traffic type information part includes information as to a traffic type of the BD that is being transmitted. In other words, the information of the traffic type information part may be information as to whether BD to be transmitted is traffic to be processed by the electrical switch or the optical switch, priority of the BD, a size of the BD, an offset time, and the like.

The signal cure solicitation part includes information as to a state of the BD to be transmitted. In other words, in a case where the BD passes through a plurality of nodes, the BD is distorted. Thus, the distorted BD may be corrected in the unit of predetermined node so that the destination node receives BD from the source node without distortion.

The source node receives a solicitation for a signal cure from the signal cure solicitation part and converts the BD into an electric signal. In general, the BD is converted into the electric signal so that the distortion of the BD is corrected. This will be described using an electric part scheduler shown in FIG. 6, and a method of curing received BD will be described later. However, in a case where the electric part scheduler is not able to cure the received BD, the electric part scheduler discards the received BD. In this case, the core node transmits information as to the discarding of the BD to the source node.

In general, BD includes a plurality of packets. In other words, the edge node generates BD including a plurality of packets having the same destination. However, in a case where packets to be transmitted to the same destination are not collected, the edge node transmits BD including packets collected in advance. Thus, the edge node can improve transmission efficiency of BD. The unification solicitation part includes BD transmitted to at least two destination nodes, not BD transmitted to one destination.

The core node classifies packets constituting received BD by destinations using the BCP. The core node adds the classified packets to BD having the same destination and being transmitted from another node and the core node then transmits the packets. In a case where the core node discards the BD, the core node transmits information as to a cause of the discarding to the edge node. This will now be described in detail.

After a node A stands by for a predetermined period of time, node A receives packets to be transmitted to nodes B through E. Table 1 below shows the packets the node A is to transmit.

TABLE 1

| Destination Node | BD to be Transmitted |
|---|---|
| Node B | First Packet |
| Node C | Second and Third Packets |
| Node D | Fourth Packet |
| Node E | Fifth Packet |

In general, if three packets are mixed to generate one piece of BD, the node a cannot generate BD. Thus, the node a must stand by until at least three packets having the same destination are transmitted. However, in this case, a packet, which must be rapidly transmitted, may be discarded due to a lapse of a service time during its transmission. Thus, the node A generates BD including first, second, and third packets having the nodes B and C as destinations and transmits the BD to an adjacent node.

The adjacent node classifies packets constituting the BD by destination nodes. The adjacent node adds the classified packets to pieces of BD having the same destination node and being transmitted from another node and then transmits the packets.

BD to be transmitted to a destination node must be transmitted to the destination node within a predetermined period of time (i.e., a serviceable time). Thus, if BD is transmitted to the destination node after the predetermined period of time, the BD is unnecessary. Therefore, the BD may be discarded. The accumulation delay counter part records a delay time of transmitted BD. The frequency part includes information as to a frequency transmitting BD. Thus, if the delay time of the transmitted BD exceeds a predetermined period of time, the core node discards the transmitted BD.

Figure 6:
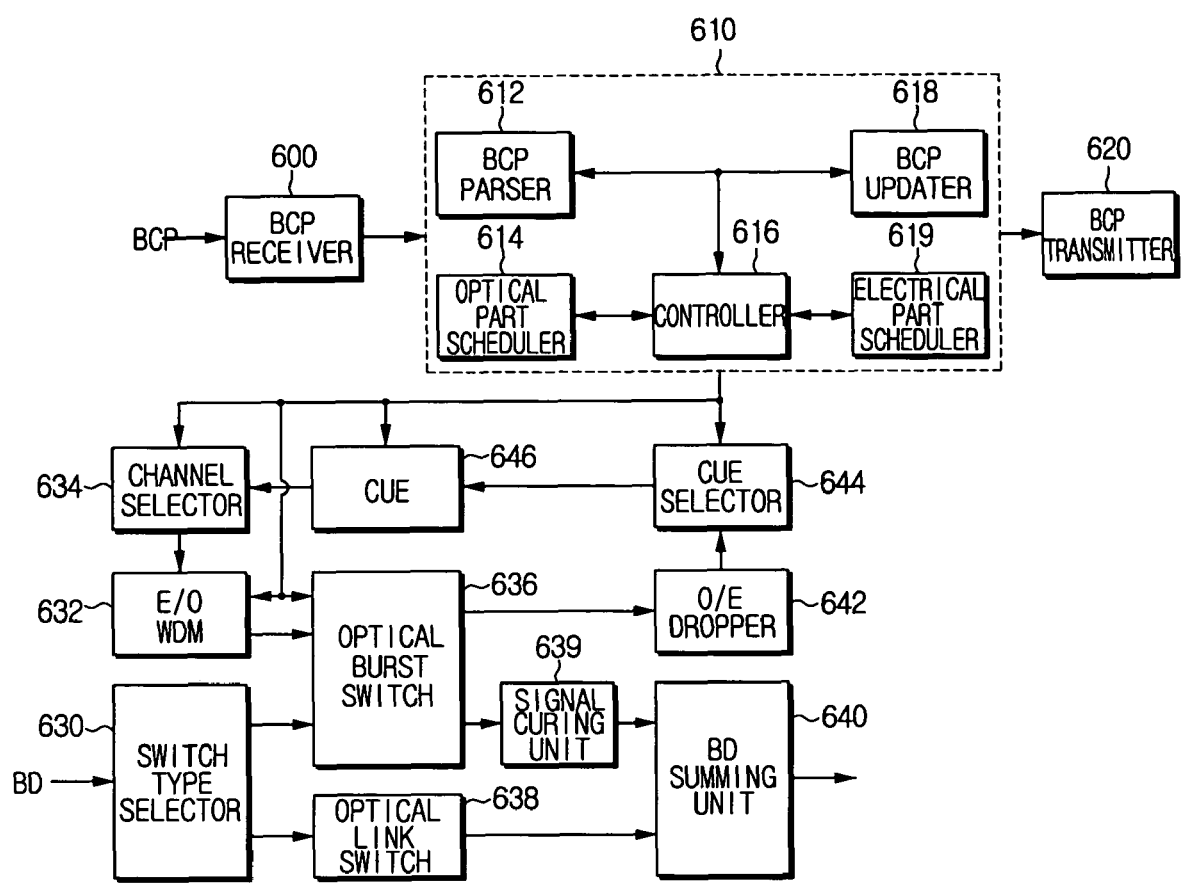
FIG. 6 is a block diagram illustrating a structure of a core node according to an exemplary embodiment of the present invention.

FIG. 6 is a block diagram of a core node according to an exemplary embodiment of the present invention. A structure of a core node according to an exemplary embodiment of the present invention will now be described with reference to FIG. 6.

Referring to FIG. 6, the core node includes a BCP receiver 600, a BCP processor 610, a BCP transmitter 620, a switch type selector 630, an E/O WDM 632, a channel selector 634, an optical burst switch 636, an optical link switch 638, a BD summing unit 640, an O/E dropper 642, a cue selector 644, a cue 646, and a signal curing unit 639. BCP processor 610 includes a BCP parser 612, an optical part scheduler 614, a controller 616, a BCP updater 618, and an electrical part scheduler 619.

BCP receiver 600 receives a BCP from an adjacent node and transmits the BCP to BCP processor 610. BCP parser 612 parses the BCP. In other words, BCP processor 610 parses BCP to determine a method of processing BD. Information parsed by BCP parser 612 is transmitted to controller 616. Controller 616 controls optical part scheduler 614 and electrical part scheduler 619 using the information. Optical part scheduler 614 takes charge of optical scheduling with respect to BD to be received, and the electrical part scheduler 619 takes charge of electrical scheduling with respect to the BD to be received. In other words, if the BD to be received is required to be optically processed, controller 616 controls optical part scheduler 614. If the BD to be received is required to be electrically processed, controller 616 controls electrical part scheduler 619.

BCP updater 618 updates the BCP using information as to BD that is changed by the core node.

Switch type selector 630 determines a switch which is to process received BD according to a control command of BCP processor 610. In a case where switch type selector 630 processes the received BD using optical link switch 638, switch type selector 630 transmits the received BD. In a case where switch type selector 630 does not use optical link switch 638, switch type selector 630 transmits the received BD to optical burst switch 636.

Optical link switch 638 performs an optical link switching operation with respect to the received BD. Further, optical burst switch 636 performs an optical burst switching operation with respect to a received optical signal. In a case where an error occurring in the BD having undergone the optical burst switching operation can be cured using light, such as by optical regeneration employing a 3R function, the BD is transmitted to the signal curing unit 639 to regenerate the BD optically. In a case where the BD cannot be cured using only the light, the BD is transmitted to the O/E dropper 642. The O/E dropper 642 converts received optical signals into electric signals and discards incurable or unnecessary signals of the electric signals. The incurable signals refers to signals which cannot be reproduced even in the case of being converted into electric signals, and the unnecessary signals include signals of which service times are ended.

Cue selector 644 sets an area of cue 646 which is to buffer a received electric signal and instructs cue 646 to buffer corresponding BD in the set area. Cue 646 buffers the received electric signal according to the instruction of cue selector 644. Channel selector 634 selects a wavelength to which the electric signal transmitted from cue 646 is allocated. Controller 616 controls cue selector 644 to select cue 646, which is to buffer the received electric signal, and controls channel selector 634 to select a channel to be allocated to the received electric signal.

E/O WDM 632 converts the electric signal received from channel selector 634 into an optical signal and multiplexes the optical signal using the allocated channel. The multiplexed optical signal (BD) is transmitted to optical burst switch 636.

The above-described signal curing method will now be described. An error occurring in a signal is cured using optical apparatuses. If the error occurring in the signal is not curable, the error is cured using electrical apparatuses. In a case where the error is cured using the electrical apparatuses, a process of converting a received optical signal into an electric signal must be first performed. A method of curing an electric signal will now be described.

In a case where a waveform error occurs in a received optical signal, re-shaping is performed to cure the waveform error. In a case where an error occurs in a transmission time of the received optical signal, re-timing is performed to cure the error in the transmission time. In a case where the error occurring in the received optical signal is not cured, re-generation is performed to cure the error.

Figure 7:
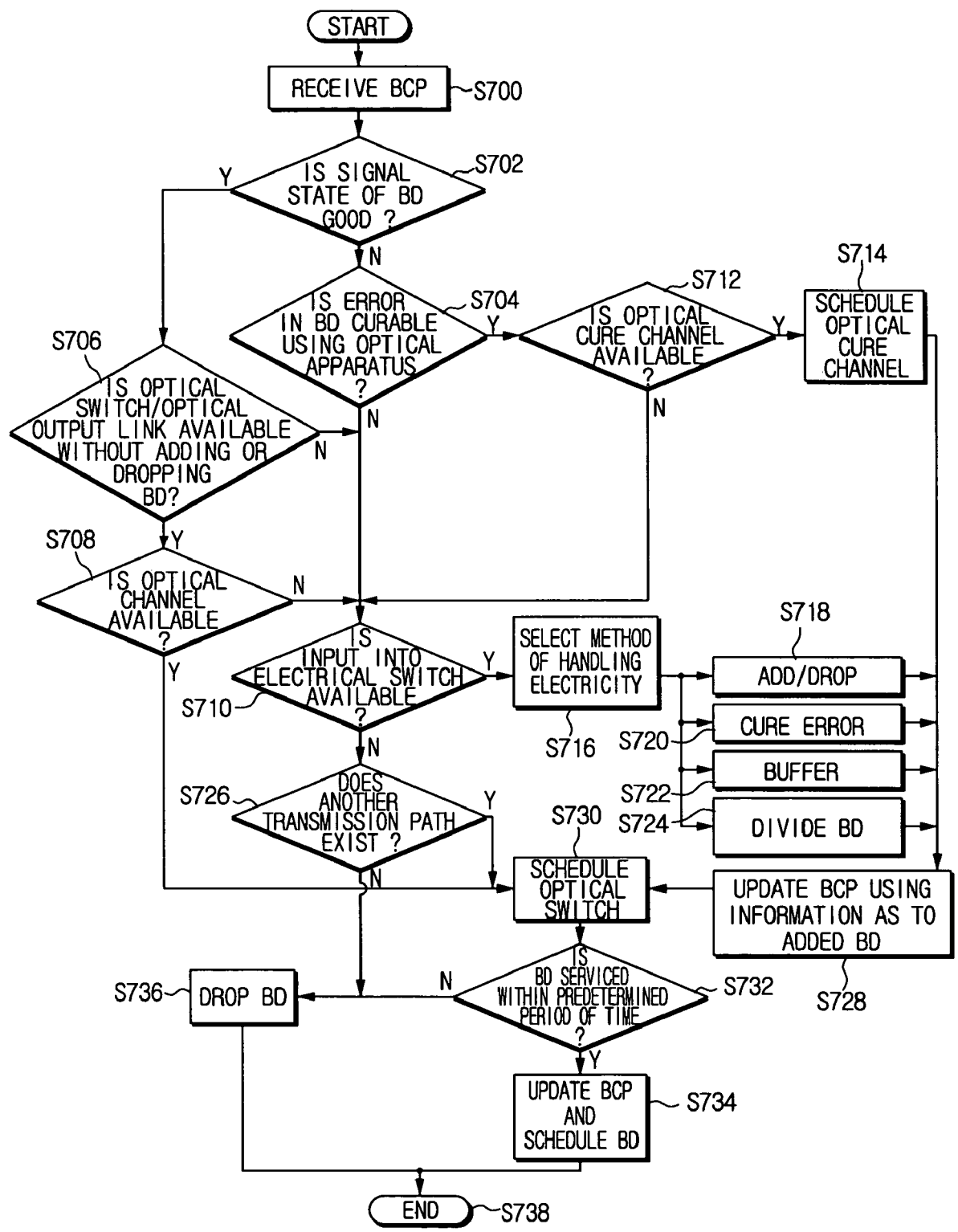
FIG. 7 is a flowchart of an operation of a core node according to an exemplary embodiment of the present invention.

FIG. 7 is a flowchart of an operation of a core node according to an exemplary embodiment of the present invention. The operation of the core node will now be described with reference to FIG. 7. In operation S700, the core node receives a BCP. In general, the BCP is received prior to BD. In operation S702, the core node checks a signal state of the BD using the BCP. In other words, the core node checks whether the state of the BD is good. If the state of the BD is good, the core node moves to operation S706. If the state of the BD is not good, the core moves to operation S704. The state of the BD is determined depending on whether the BD is transmitted to a next node without an error.

In operation S704, the core node determines whether an error occurring in the BD is curable using an optical apparatus. If the core node determines in operation S704 that the error occurring in the BD is curable using the optical apparatus, the core node moves to operation S712. If the core node determines in operation S704 that the error occurring in the BD is not curable using the optical apparatus, the core node moves to operation S710.

In operation S706, the core node determines whether an optical switch and an optical output link are simultaneously available without adding or dropping the BD. If the core node determines in operation S706 that the optical switch and the optical output link are simultaneously available without adding or dropping the BD, the core node moves to operation S708. Conversely, if the core node determines in operation S706 that the optical switch and the optical output link are not simultaneously available without adding or dropping the DB, the core node moves to operation S710.

In operation S708, the core node determines whether an optical channel is available. If the core node determines in operation S708 that the optical channel is available, the core node moves to operation S730. If the core node determines in operation S708 that the optical channel is not available, the core node moves to operation S710. In operation S712, the core node determines whether an optical cure channel, which cures and transmits the BD, is available. If the core node determines in operation S712 that the optical cure channel is not available, the core node moves to operation S710. If the core node determines in operation S712 that the optical cure channel is available, the core node moves to operation S714. In operation S714, the core node performs optical cure channel scheduling to transmit the BD to the optical cure channel.

In operation S710, the core node determines whether an input into an electrical switch is available. In other words, the core node determines whether the electrical switch is available to receive the BD. If the core node determines in operation S710 that the input into the electrical switch is available, the core node moves to operation S716. If the core node determines in operation S710 that the input into the electrical switch is not available, the core node moves to operation S726. In operation S716, the core node selects a method of handling electricity. The method of handling the electricity is performed through operations S718, S720, S722, and S724. Thus, the core node selects an electricity handling method and then moves to an operation corresponding to the electricity handling method.

The core node adds or drops BD converted into an electric signal in operation S718 and cures the error in operation S720. A method of curing the error is as described above. The core node performs buffering to delay a transmission of the BD in operation S722 and divides the BD in operation S724. In other words, if the core node receives BD having a plurality of destination nodes, the core node divides packets by the destination nodes.

In operation S728, the core node updates the BCP using information as to added BD. In operation S726, the core node determines whether another transmission path exists. If the core node determines in operation S726 that the another transmission path exists, the core node moves to operation S730. If the core node determines in operation S726 that the another transmission path does not exist, the core node moves to operation S736.

In operation S730, the core node performs optical switching scheduling. For this purpose, if a received signal is an electric signal, the core node must first covert the electric signal into an optical signal. In operation S732, the core node determines whether the BD is serviced within a predetermined period of time. If the core node determines in operation S732 that the BD is not serviced within the predetermined period of time, the core node moves to operation S736 to discard the received BD. If the core node determines in operation S732 that the BD is serviced within the predetermined period of time, the core node moves to operation S734 to update the BCP and schedule the BD.

In a case where an optical link switch is used as described above, a BCP may be transmitted in the unit of optical link not in the unit of BD.

As described above, aspects of the present invention provide a method of processing received BD using an electrical switch in addition to an optical burst switch in an OBS network. In other words, the received BD can be processed using one of the optical burst switch and the electrical switch depending on the characteristic of the BD so as to reduce loss of the BD.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An optical burst switching network comprising:
    an edge node that transmits a burst control packet and burst data comprising a plurality of packets; and
    a core node that receives the burst control packet and burst data, determines a signal state of the received burst data from a predetermined field of the burst control packet, the predetermined field including information as to the signal state of the received burst data, and optically or electrically switches the received burst data according to the signal state of the received burst data,
    wherein the edge node solicits the core node to cure the signal state of the burst data using an optical part or an electrical part if a number of packets having an identical destination node is less than or equal to a set value.

2. The optical burst switching network of claim 1, wherein the core node optically switches the burst data that is received according to one of optical burst switching, wavelength channel switching, and optical link switching.

3. The optical burst switching network of claim 1, wherein the edge node transmits burst data comprising packets that have different destination nodes if a number of packets that have an identical destination node is less than or equal to a set value.

4. The optical burst switching network of claim 1, wherein the core node discards the burst data if the signal state of the burst data is not curable.

5. The optical burst switching network of claim 1, wherein the edge node transmits, to the core node, information of a transmission delay time of the burst data.

6. The optical burst switching network of claim 5, wherein the core node discards the burst data if the transmission delay time of the burst data exceeds a set value.

7. The optical burst switching network of claim 1, wherein the core nodes comprises:
    a switch type selector that selects a switch which is to process the burst data;
    an optical link switch that receives the burst data from the switch type selector;
    an optical burst switch that optically switches or electrically switches the burst data that is received from the switch type selector; and
    an opto-electric dropper that converts the burst data that is received from the optical burst switch into an electrical signal and discards an electrical signal of converted electrical signals that is solicited to be discarded.

8. The optical burst switching network of claim 1, wherein the core node comprises:
    a burst control packet parser that parses information of the burst control packet that corresponds to the burst data according to a control command;
    a controller that determines whether to optically or electrically process the burst data, using the information that is received from the burst control packet parser;
    an optical part scheduler that optically processes the burst data according to a solicitation of the controller to optically process the burst data; and
    an electrical part scheduler that electrically processes the burst data according to a solicitation of the controller to electrically process the burst data.

9. The optical burst switching network of claim 1, wherein the core node converts the received burst data into an electric signal and electrically switches the converted burst data if an optical switch and optical output link are not simultaneously available.

* * * * *